United States Patent
Scott et al.

(10) Patent No.: US 11,256,679 B2
(45) Date of Patent: Feb. 22, 2022

(54) SYSTEMS AND METHODS FOR STORING OBJECT STATE ON HASH CHAINS

(71) Applicants: Glenn Carter Scott, Los Altos Hills, CA (US); Michael Richard Gabriel, Portola Valley, CA (US)

(72) Inventors: Glenn Carter Scott, Los Altos Hills, CA (US); Michael Richard Gabriel, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 461 days.

(21) Appl. No.: 16/206,987

(22) Filed: Nov. 30, 2018

(65) Prior Publication Data
US 2020/0174988 A1 Jun. 4, 2020

(51) Int. Cl.
*G06F 16/23* (2019.01)
*G06F 16/21* (2019.01)
*G06F 40/205* (2020.01)
*H04L 9/06* (2006.01)

(52) U.S. Cl.
CPC ........ *G06F 16/2329* (2019.01); *G06F 16/219* (2019.01); *G06F 40/205* (2020.01); *H04L 9/0643* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 2018/0039667 A1* | 2/2018 | Pierce | G06F 16/2379 |
| 2018/0089641 A1* | 3/2018 | Chan | G06Q 40/06 |
| 2020/0084041 A1* | 3/2020 | Xu | H04L 9/3247 |

\* cited by examiner

*Primary Examiner* — Giuseppi Giuliani
(74) *Attorney, Agent, or Firm* — Ferguson Braswell Fraser Kubasta PC

(57) ABSTRACT

A method for storing object state on hash chains. A block of a hash chain is located with an accessor function. The block includes a field value of a field of an object. Version data is located using the block. The version data identifies a block version of the block. The block version is compared to a function version of the accessor function. The field value from the block is returned when the block version matches the function version. A version matched accessor function is called to return the field value when the block version does not match the function version.

20 Claims, 11 Drawing Sheets

SYSTEMS AND METHODS FOR STORING OBJECT STATE ON HASH CHAINS

BACKGROUND

Computer programming objects store information with sets of fields. The state of an object is determined by the values for the fields of the object. Hash chains may be used within objects to store historical field values and states of the object. Storing the field values and states of an object using hash chains may require large amounts of storage space to hold multiple copies of field values, may require traversing significant portions of the hash chains to retrieve the values of particular fields and the state of an object, and may involve different versions of the object. Better methods are needed for storing field values in hash chains of objects having multiple versions without consuming large amounts of storage space and for retrieving the values and states of an object without the need to traverse significant portions of the hash chains.

SUMMARY

In general, in one aspect, embodiments are related to a method for storing object state on hash chains. A block of a hash chain is located with an accessor function. The block includes a field value of a field of an object. Version data is located using the block. The version data identifies a block version of the block. The block version is compared to a function version of the accessor function. The field value from the block is returned when the block version matches the function version. A version matched accessor function is called to return the field value when the block version does not match the function version.

In general, in one aspect, embodiments are related to a system for storing object state on hash chains. The system includes a memory coupled to a computer processor. The memory includes an object with a plurality of fields. The object executes on the computer processor and uses the memory. A block of a hash chain is located with an accessor function. The block includes a field value of a field of the object. Version data is located using the block. The version data identifies a block version of the block. The block version is compared to a function version of the accessor function. The field value from the block is returned when the block version matches the function version. A version matched accessor function is called to return the field value when the block version does not match the function version.

In general, in one aspect, embodiments are related to a non-transitory computer readable medium comprising computer readable program code for storing object state on hash chains. A block of a hash chain is located with an accessor function. The block includes a field value of a field of an object. Version data is located using the block. The version data identifies a block version of the block. The block version is compared to a function version of the accessor function. The field value from the block is returned when the block version matches the function version. A version matched accessor function is called to return the field value when the block version does not match the function version.

Other aspects of the invention will be apparent from the following description and the appended claims.

DETAILED DESCRIPTION

Figure 1A:
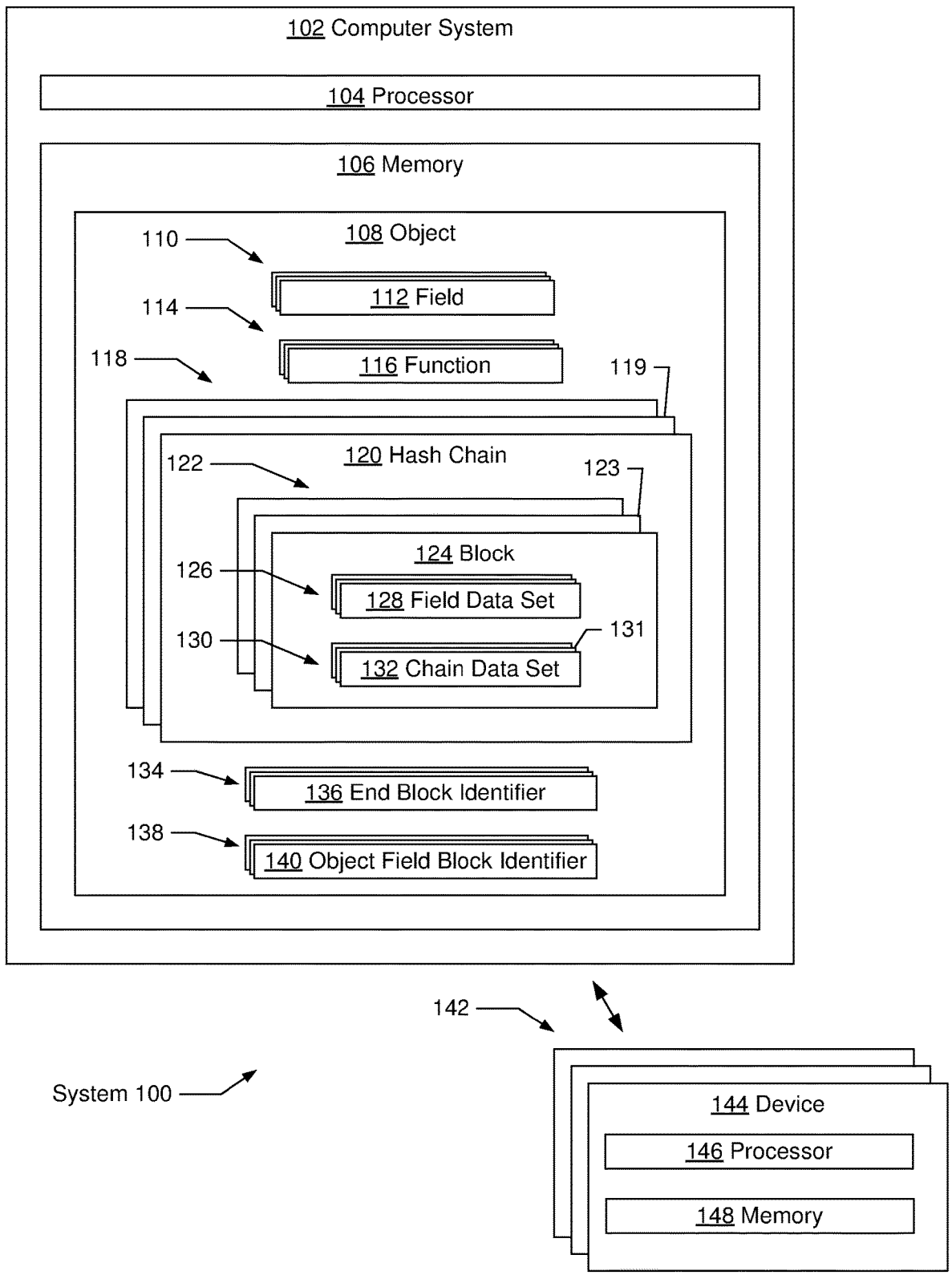
FIG. 1A, FIG. 1B, FIG. 1C, and FIG. 1D show a system in accordance with one or more embodiments of the present disclosure.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments that are in accordance with the disclosure include objects having multiple versions that store field values and version data in a hash chain. The hash chain includes field blocks that store individual updates to the values of the fields of the object and includes version blocks that identify the version of the blocks stored on the hash chain. Accessor functions traverse the hash chain to locate a field block and then continue to traverse the hash chain to locate a version block that identifies the version of the located field block.

In general, embodiments that are in accordance with the disclosure include objects having multiple versions, in which the field blocks are used to identify the version data. In one or more embodiments, the field blocks store version block identifiers that identify the version blocks in the hash chain. In one or more embodiments, the field blocks themselves store the version data. In one or more embodiments, the field blocks store version block identifiers that identify the version blocks in a separate version block hash chain.

In general, embodiments that are in accordance with the disclosure include objects having multiple versions, in which new hash chains are generated for the new versions of the object. A hash chain of a prior version includes a pending version update block that indicates a new version is being created and a version update block that indicates a new version has been created. A hash chain of a new version includes a previous version block that identifies the version update block of the prior hash chain and allows accessor functions to traverse from the new version hash chain to the prior version hash chain.

FIG. 1A, FIG. 1B, FIG. 1C, and FIG. 1D show diagrams of the system (100) in accordance with one or more disclosed embodiments. The various elements of the system (100) may correspond to the computing system shown in FIG. 10A and FIG. 10B. In particular, the type, hardware, and computer readable medium for the various components of the system (100) is presented in reference to FIG. 10A and FIG. 10B. In one or more embodiments, one or more of the elements shown in FIGS. 1A, 1B, 1C, and 1D may be omitted, repeated, combined, and/or altered as shown from FIGS. 1A, 1B, 1C, and 1D. Accordingly, the scope of the present disclosure should not be considered limited to the specific arrangements shown in FIGS. 1A, 1B, 1C, and 1D.

Referring to FIG. 1A, the system (100) includes the computer system (102) and the set of devices (142). The set of devices (142) may interact with the object (108) of the computer system (102).

Figure 10A:
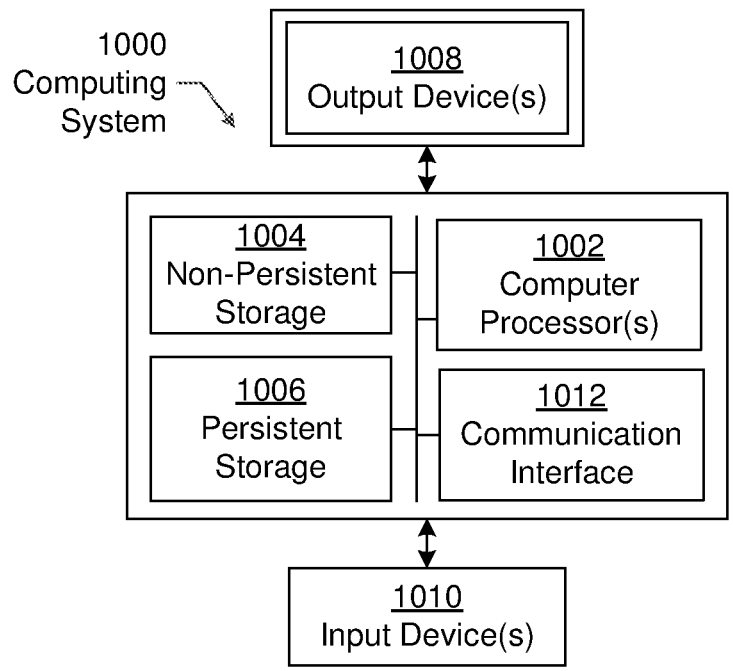
FIGS. 10A and 10B show computing systems in accordance with disclosed embodiments.
Figure 10B:
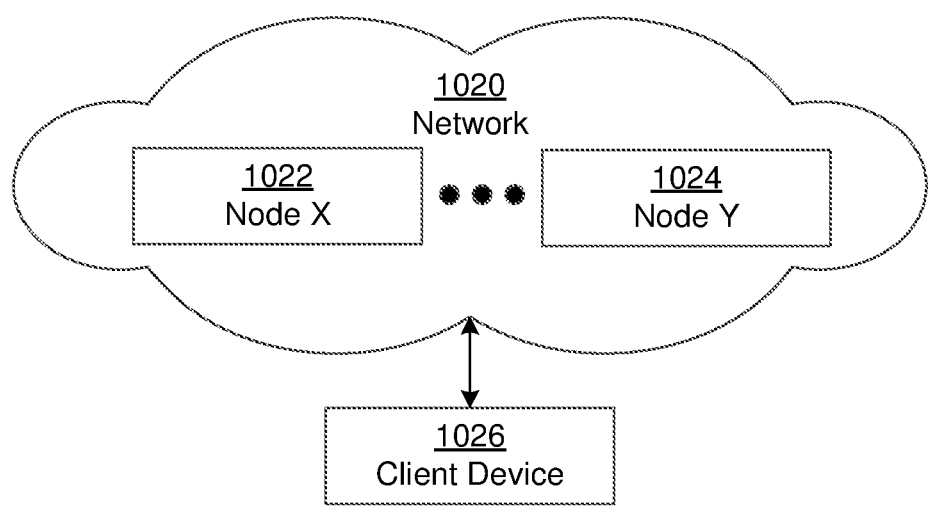

The computer system (102) is an embodiment of the computing system (1000 in FIG. 10A) and nodes (1022, 1024 in FIG. 10B) described in FIGS. 10A and 10B, respectively. Returning to FIG. 1, the computer system (102) is a physical computing device with the computer processor (104) and the memory (106). The computer processor (104) executes the functions (114) of the object (108), which is stored in the memory (106).

The object (108) is a programming object resident within the memory (106) formed from a combination of variables, functions, and data structures. The object (108) includes one or more fields (110), functions (114), hash chains (118), end block identifiers (130), and object field block identifiers (138). The object (108) may be of an object of a program written in an oriented programming language or may be a program written in a non-object oriented programming language. The object (108) may be written in any number of programming languages including Java, JavaScript, ANSI C, C++, Python, Perl, PHP, etc.

The fields (110) are the variables of the object (108) that identify the state of the object (108). The fields (110) have names and values that are stored within the hash chains (118) as the field data sets (126). A field may be of any type including: floating-point numbers, integers, characters, strings, other objects, etc. In one or more embodiments, the field (112) corresponds to the field data set (128) in the block (124) of the hash chain (120).

The functions (114) are sequences of program instructions that perform specific tasks for the object (108). The functions (114) include accessor functions that may read from and write to the fields (110) of the object (108) and may include functions to update the state of the object (108) by manipulating the values of the fields (110). The functions (114) include the function (116), which is an accessor function for the field (112) in one or more embodiments.

In one or more embodiments, the hash chains (118) include the hash chain (119) and the hash chain (120). The hash chains (118) record the values of the fields (110) of the object. The values of the fields (110) are recorded in the blocks (122) using a cryptographic hash function so that the historical values cannot be changed without detection. Suitable cryptographic hash algorithms for the cryptographic hash function used to store the values include Message Digest 5 (MD5), Secure Hash Algorithm (SHA), SHA-1, SHA-2, SHA-3, RACE Integrity Primitives Evaluation Message Digest (RIPEMD-160), Whirlpool, BLAKE, BLAKE2, etc.

In one or more embodiments, the blocks (122) include the present and historical values of the fields (110). The sequence of the blocks (122) is immutable so that any change to the order of the blocks (122) or the values within the blocks (152) is detectable by recalculating and verifying the hash values generated for each of the blocks (122). In one or more embodiments, the blocks (122) include the block (123) and the block (124).

The block (124) is one of the blocks (122). The block (124) includes field data sets (126) and chain data sets (130), which are further described below in FIG. 1B and FIG. 1C. In one or more embodiments, the blocks (122) include summary blocks. A summary block includes values or identifiers for each of the fields (110) to record the state of the object (108) in the summary block.

The end block identifiers (134) identify the end blocks of the hash chains (118). An end block of a hash chain is the most recently added block to the hash chain and is the block to which the next block of the hash chain is appended, which will become the next end block. In one or more embodiments, the end block identifier (136) identifies the block (124) as the end block of the hash chain (120).

The object field block identifiers (138) identify blocks (122) within the hash chains (118). In one or more embodiments, the current state of the object (108) is identified with the object field block identifiers (138), which identify a set of blocks of the hash chains (118) that contain the current values for the fields (110). In one or more embodiments, the object field block identifier (140) of the object field block identifiers (138) identify the block (124) as containing the current value for the field (112).

In one or more embodiments, the devices (142) include the device (144) and are used to access the object (108). In one or more embodiments, the device (144) is a computing system that executes one or more of programs on a physical computing device with processors (146) and memory (148), such as the computing system (1000) and nodes (1022, 1024) described in FIGS. 10A and 10B. The devices (142) are described further below in FIG. 1D.

Figure 1B:
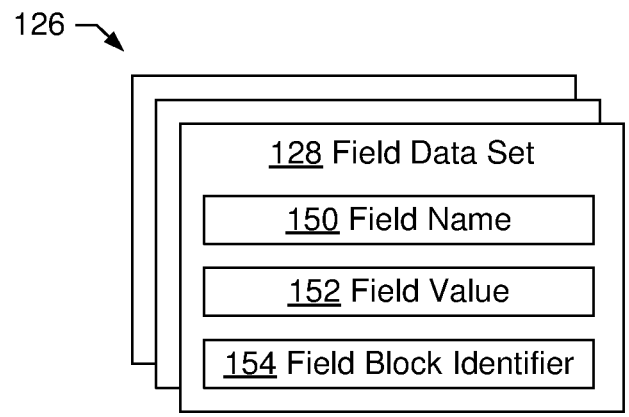

Referring to FIG. 1B, the field data sets (126) include the field data set (128) in accordance with one or more embodiments. The field data sets (126) store the values of the fields (110) of the object (108). In one or more embodiments, the field data set (128) stores the value for the field (112) of FIG. 1A. The field data set (128) includes the field name (150), the field value (152), and the field block identifier (154).

The field name (150) identifies one of the fields (110) that is related to the field data set (128). In one or more embodiments, the field name (150) identifies the name of the field (112).

In one or more embodiments, the field value (152) stores the value of a field of the object (108). The field value (152) may be any data type including an integer, a floating point value, a character, string, another object, a serialized version of another object, etc. In one or more embodiments, the field value (152) is the value for the field (112) of FIG. 1A, which is identified by the field name (150).

In one or more embodiments, the field block identifier (154) identifies a block with a value for a field of the object. In one or more embodiments, instead of storing the value of the field in a block, the field block identifier (154) identifies another block in one of the hash chains (118) that includes the value of the field. For example, instead of storing the value of the field in the field value (152), the field block identifier (154) may be used to identify a different block that includes the field value and the field name. The field block identifier (154) may be used in a summary block to reduce the amount of memory required for the summary block, such as when the field is another object, which may be large and complex.

Figure 1C:
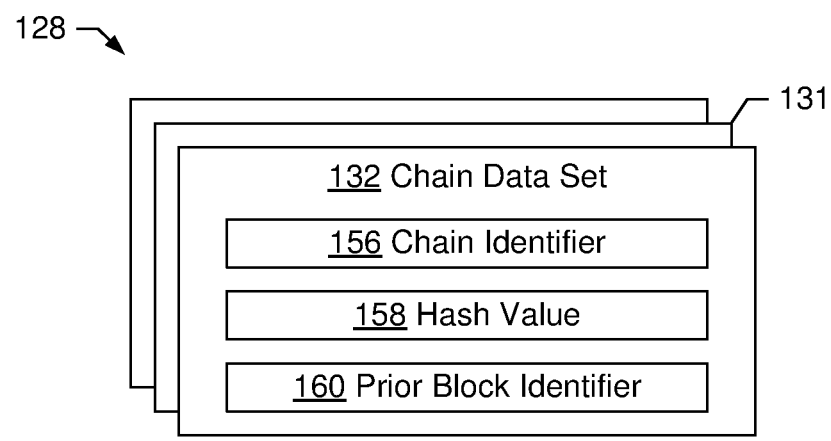

Referring to FIG. 1C, the chain data sets (128) include the chain data set (131) and the chain data set (132) in accordance with one or more embodiments. The chain data sets (128) store hash chain information for the block (124) that relates the block (124) to one or more of the hash chains (118) of the object (108). The block (124) may include chain data sets (128) that identify the hash chains (118) to which the block (124) belongs. As an example, the chain data set (132) links the block (124) to the hash chain (120) and the chain data set (131) links the block (124) to the hash chain (119). The chain data set includes the chain identifier (156), the hash value (158), and the prior block identifier (160).

In one or more embodiments, the chain identifier (156) identifies one of the hash chains (118) to which the block (124) belongs. In one or more embodiments, the chain identifier (156) identifies that the block (124) belongs to the hash chain (120).

In one or more embodiments, the hash value (158) is a cryptographic hash value generated for the block (124). In one or more embodiments, the hash value (158) is generated by applying a cryptographic hash algorithm to the field data sets (126) for the block (124) and the hash value of the prior block in the hash chain identified with the chain identifier (156). As an example, when the block (124) includes a single field with the value stored in the field data set, then the field value and the hash value of the prior block are combined by appending the hash value to the field value to form a message. The cryptographic hash algorithm is then applied to the message. When the block (124) includes multiple field values, the multiple field values are combined with the prior block hash value, such as by appending the multiple field use together and then appending the prior block hash value to form the message that is then hashed with the cryptographic hash algorithm. When the block (124) includes field block identifiers, the field values may be retrieved using the field block identifiers to form the message or the field block identifiers may be used in place of the field values to form the message. The message used to generate the hash value (158) includes one or more field values and field block identifiers and includes the prior block hash value. The message is hashed with a cryptographic hash algorithm to form the hash value (158).

The prior block identifier (160) identifies a prior block in the hash chain of the block (124). In one or more embodiments, the prior block identifier may be the hash value of the prior block. In one or more embodiments, the prior block identifier (160) identifies the block (123) from FIG. 1A as the block that is immediately preceding the block (124) in the hash chain (120).

Figure 1D:
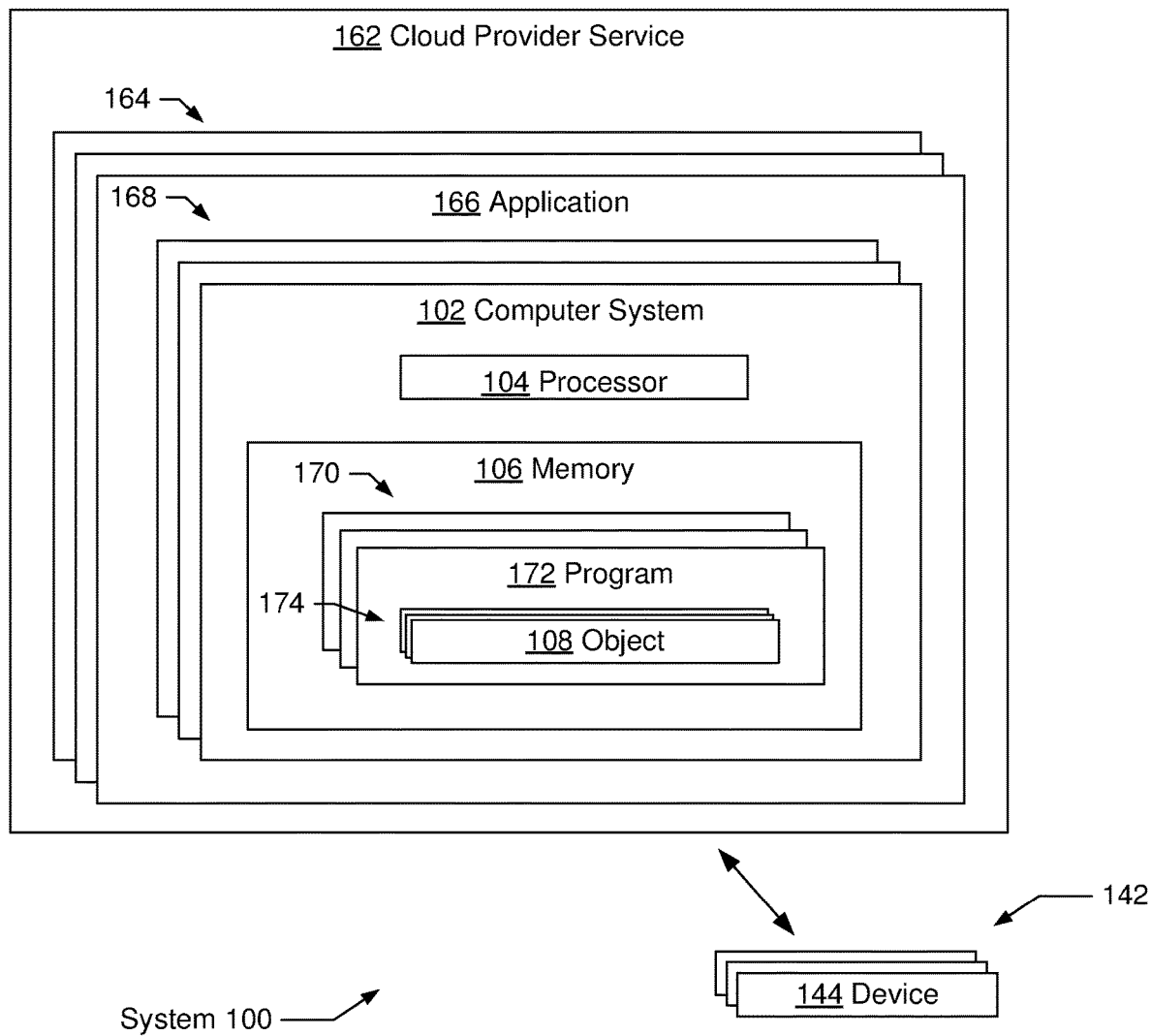

Referring to FIG. 1D, an example is shown where the cloud provider service (162) hosts the application (166), which includes the program (172), which includes the object (108). The cloud provider service (162) provides the information technology infrastructure for deploying distributed applications and web services, including the applications (164).

In one or more embodiments, the applications (164) include the application (166). In one or more embodiments, the application (166) is a distributed application that operates on the computer systems (168). As an example, the application (166) may be a web service, such as a website, and may be accessible to the devices (142) through a representational state transfer (RESTful) application programming interface (API).

The computer systems (168) include the computer system (102). In one or more embodiments, the computer systems (168) include the programming instructions and data for executing the application (166).

The computer system (102) includes the computer processor (104) and the memory (106), as described in FIG. 1A. The memory (106) includes the programs (170).

The programs (170) execute a part of the application (166) on the computer system (102). The programs (170) may be written in any number of programming languages including Java, JavaScript, ANSI C, C++, Python, Perl, PHP, etc. The programs (170) include the program (172), which includes the objects (174), which include the object (108). Programs written in languages that are not object oriented may still be treated as programming objects, such as by using shell commands and scripts to interface the programs.

In one or more embodiments, the objects (174) form the program (172), which executes a part of the application (166). The objects (174) include the object (108), which is further described with respect to FIG. 1A.

The devices (142) include the device (144), which may interact with the application (166). As an example, when the application (166) is a website, the device (144) may use a web browser to access the website provided by the application (166), which uses the object (108).

Figure 2:
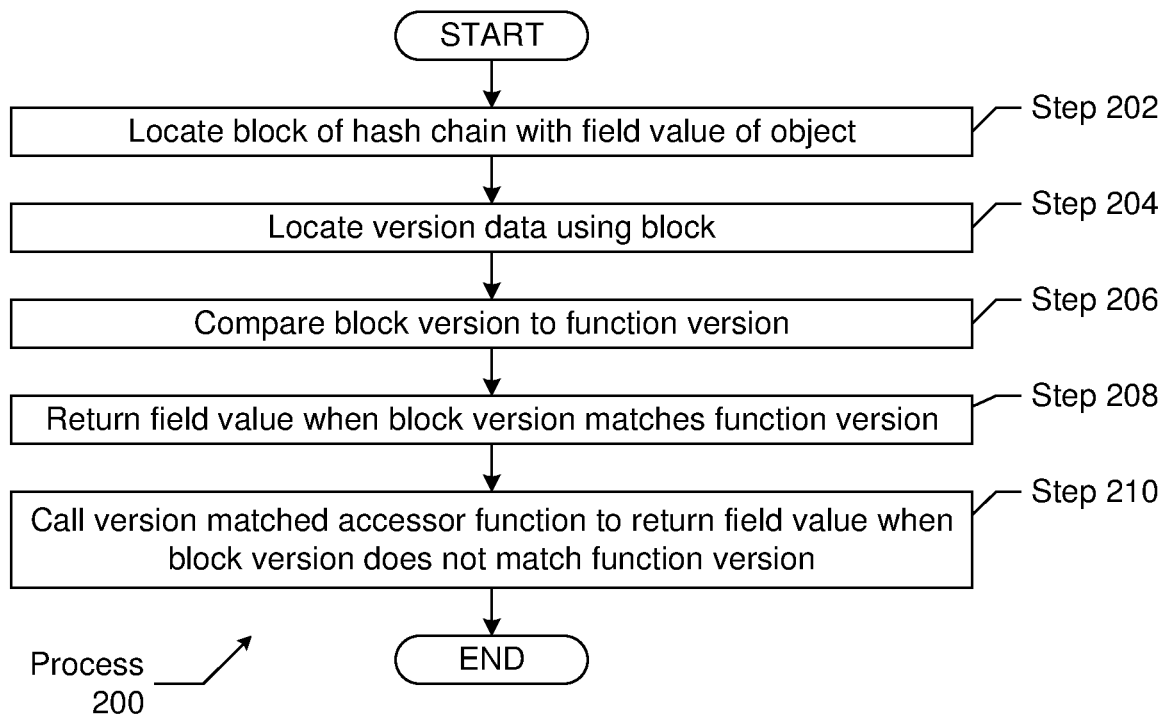
FIG. 2, FIG. 3A, FIG. 3B, and FIG. 4 show methods in accordance with one or more embodiments of the present disclosure.

FIG. 2 shows a flowchart in accordance with one or more embodiments of the disclosure. The flowchart of FIG. 2 depicts a process (200) for reading from a hash chain. The process (200) may be implemented on one or more components of the system (100) of FIG. 1. In one or more embodiments, one or more of the steps shown in FIG. 2 may be omitted, repeated, combined, and/or performed in a different order than the order shown in FIG. 2. Accordingly, the scope of the present disclosure should not be considered limited to the specific arrangement of steps shown in FIG. 2.

In Step 202, a block of a hash chain with a field value of an object is located. In one or more embodiments, an accessor function for reading data from the hash chain starts at the end block of the hash chain. When the end block is not the correct block, the accessor function proceeds to the prior block in the hash chain. The accessor function continues to traverse the blocks of the hash chain until the correct block is found. The correct block is the block of the hash chain that matches a criterion of the accessor function. In one or more embodiments, the criterion is one or more of a location of the block in the hash chain, a value of the block, and a time the block was added to the hash chain. In one or more embodiments, the first block that satisfies the criteria required by the accessor function is determined to be the correct block to access.

The location criterion identifies the ordinal position of the block within the hash chain. The location criterion is specified as a block that is at, within, or beyond a specific position relative to the head or tail of the hash chain. The head and tail of the hash chain refer to the beginning and end blocks of the hash chain.

The value criterion identifies the value of data within the block. The value criterion specifies whether the value from the block is at, above, or below a threshold value from the value criteria.

The time criterion identifies the time that a block is added to the hash chain. The time criterion is specified as a block that is added to the hash chain at, before, or after a specified time.

In Step 204, version data is located using the block. The version data is associated with the block using one or more methods.

In one or more embodiments, the version data is stored outside of the block being accessed in a version block. The version block includes data field sets that specify one or more of the version of the block, the version of the object containing the hash chain, and the versions of the fields within the block. The version block is located by continuing to traverse the hash chain until the next version block is identified.

In one or more embodiments, the version data is stored outside of the block being accessed and the block being accessed includes an identifier for the version block storing the version data. Instead of traversing the blocks between the block being accessed and the version block, the version block identifier of the block being accessed allows the accessor function to immediately locate the version block from the block being accessed and access the version data. In one or more embodiments, the version blocks are in the same hash chain as the block being accessed. In one or more embodiments, the version blocks are in a separate chain that includes version blocks without the block that is being accessed.

In Step 206, the block version is compared to the function version. After locating the version data for the block, a block version is identified from the version data and compared to the function version of the accessor function. The block version identifies one or more of the versions of the object and the fields of the block that were used when the block was added to the hash chain. The function version identifies one or more of the versions of the object and the fields that the accessor function is able to access.

In Step 208, when the block version matches the function version, a field value is returned with the accessor function. The block version matches the function version when the versions of the object and fields of the block are the same as the versions of the objects and fields of the accessor function. In one or more embodiments, the accessor function accesses a reduced set of fields that does not include one or more fields that are available in the block. The versions of the reduced set of fields are compared and matched to the versions of similar fields from the block.

In Step 210, when the block version does not match the function version, a version maxed accessor function is called to return a field value. When the block version does not match the function version, a mismatch is detected for one or more of the versions of the object and the fields between the block and the accessor function. When a mismatch is detected, one or more version matched accessor functions, referred to as translator functions, are called to access the field values from the block. In one or more embodiments, when multiple mismatches are detected, one or more translator functions are called and the fields of the block being accessed will be returned by the accessor function and the one or more translator functions that match the versions of the object and fields.

Figure 3A:
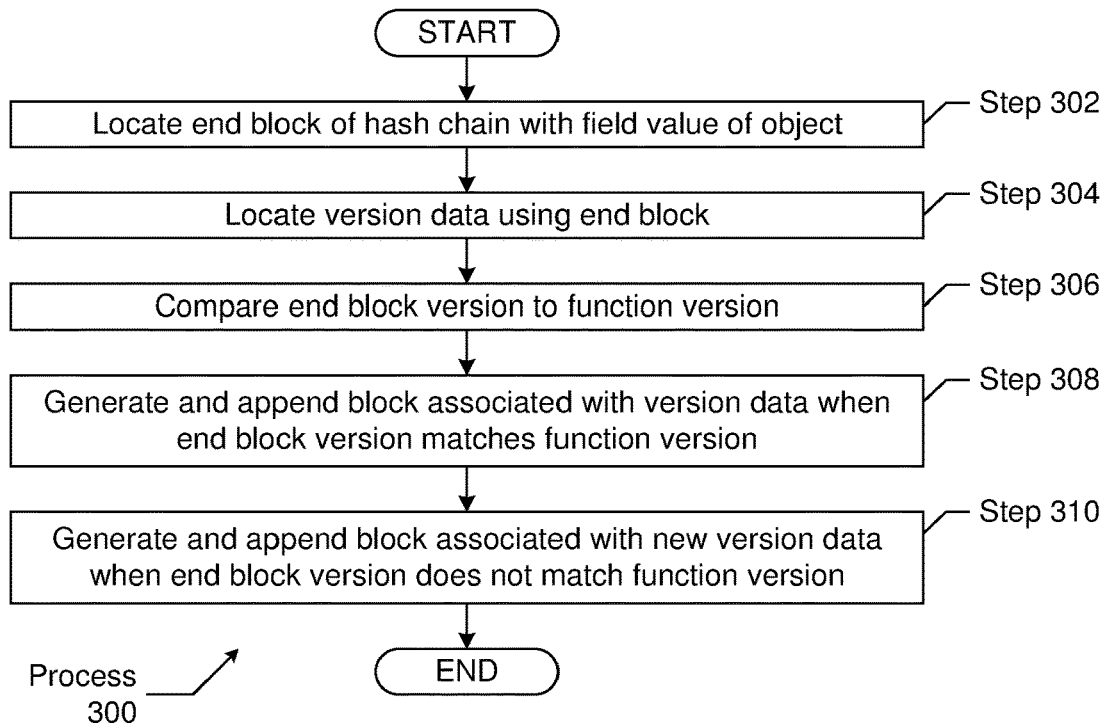
Figure 3B:
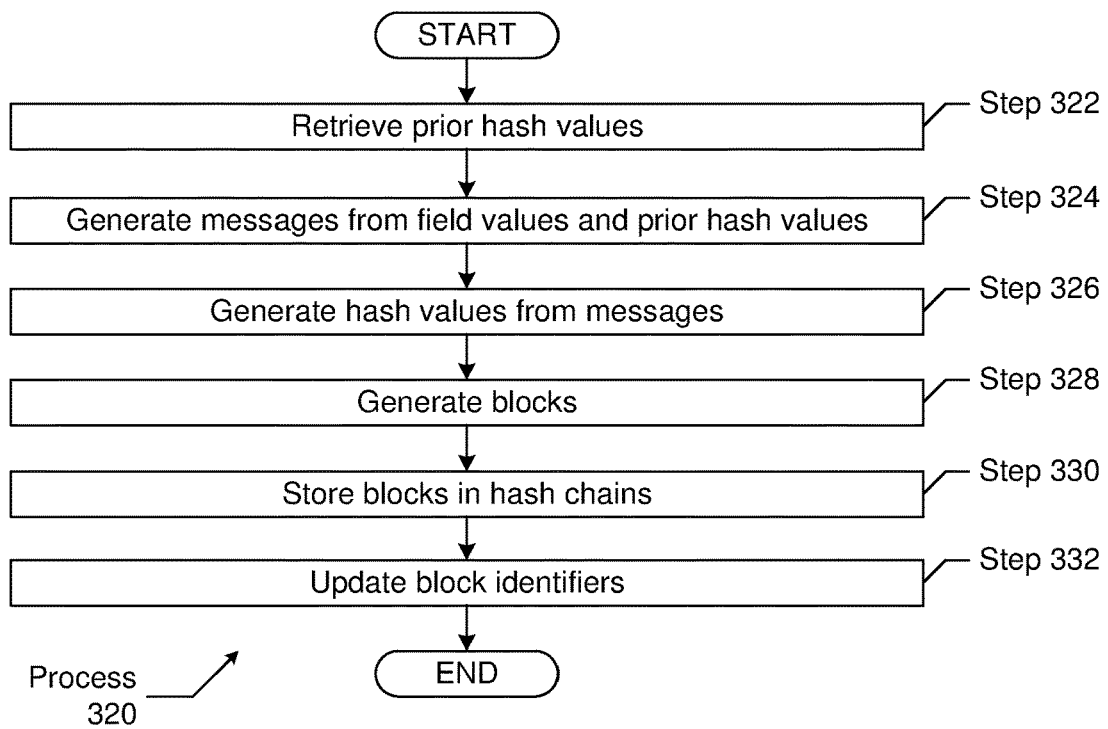

FIGS. 3A and 3B show a flowchart in accordance with one or more embodiments of the disclosure. Referring to FIG. 3A, the flowchart of FIG. 3A depicts a process (300) for writing to a hash chain using version data. The process (300) may be implemented on one or more components of the system (100) of FIG. 1. In one or more embodiments, one or more of the steps shown in FIG. 3A may be omitted, repeated, combined, and/or performed in a different order than the order shown in FIG. 3A. Accordingly, the scope of the present disclosure should not be considered limited to the specific arrangement of steps shown in FIG. 3A.

In Step 302, the end block of the hash chain with the field value of the object is located. In one or more embodiments, the object includes multiple fields that are stored in multiple hash chains. The accessor function determines which hash chain includes the field to be written and identifies the end block of the correct hash chain. When multiple values to multiple fields are to be written, the accessor function determines the end blocks for the one or more hash chains that include the fields to be written.

In Step 304, version data is located using the end block. As further described above in Step 204 of FIG. 2, one or more methods are used to associate the version data with the end block. For example, the version data may be located by (i) traversing the hash chain to find the version block with the version data, (ii) accessing the version block using a version block identifier from the end block, or (iii) accessing the version data from within the end block.

In Step 306, the end block version is compared to the function version. As further described above in Step 206 of FIG. 2, the versions of the end block are compared to the versions needed by the function for the fields and object being written.

In Step 308, when the end block version matches the function version, a block associated with the version data is generated and appended to the hash chain. The block version matches the function version when the versions of the object and fields of the block are the same as the versions of the objects and fields of the accessor function. The version data that matches between the block and the accessor function is used as the version data for the new block that is generated and appended to the hash chain. Writing a block to the hash chain is further described in FIG. 3B.

In Step 310, when the end block version does not match the function version, a block associated with new version data is generated and appended to the hash chain. The new version data is the version data associated with the end block, which is newer than the version data associated with the accessor function. In one or more embodiments, a translator function is called to translate the field value from the accessor function to a version that matches the version of the end block. Writing a block to the hash chain is further described in FIG. 3B.

Referring to FIG. 3B, the flowchart of FIG. 3B depicts a process (320) for writing blocks to a hash chain. The process (320) may be implemented on one or more components of the system (100) of FIG. 1. In one or more embodiments, one or more of the steps shown in FIG. 3B may be omitted, repeated, combined, and/or performed in a different order than the order shown in FIG. 3B. Accordingly, the scope of the present disclosure should not be considered limited to the specific arrangement of steps shown in FIG. 3B.

In Step 322, prior hash values are retrieved. In one or more embodiments, the immediately prior blocks to the end blocks are identified from prior block identifiers within chain data sets of the end blocks. After identifying the prior blocks, the hash values from the chain data of the prior blocks are retrieved.

In Step 324, messages are generated from field values and prior hash values. The messages are the inputs to a cryptographic hash function. The messages are generated by combining field values for the new blocks with the hash values from the prior blocks. One or more of the field names, field values, and field block identifiers may be appended together with the hash value from a prior block to form a message, which may be in a binary or serialized format. Version data is stored in either a field data set or a chain data set. When stored in a field data set, the version data becomes part of the message used to generate the hash value. When stored in a chain data, the version data is not part of the message used to generate the hash value.

The example below shows the message formed as a JSON formatted string from the field information provided in the write request and the hash value of a prior block.

```
{ "Name":"John Maximus",
  "Age":"21",
  "Prior Hash
    Value":"B5AEAF478D38352B401DE55B240CB5F245189A69" }
```

The field information identifies that the value of "John Maximus" is to be written to the field "Name" and the value of "21" is to be written to the field "Age". The hash value of "B5AEAF478D38352B401DE55B240CB5F245189A69" from the prior block is also included in the message and was generated using the SHA-1 algorithm for this example.

In Step 326, hash values are generated from messages. For each message generated using field data set information from the write request, a hash value is generated using a cryptographic hash function. Continuing the example from above, the SHA-1 algorithm is used to generate the hash value shown below from the example message from Step 324.
SHA-1 hash value: 54F15577E4C6CAC4ACC8AD273F4563FB9AAF08E0

A block may be part of multiple hash chains and hash values may be generated for one or more hash chains that a block is a part of. For example, a single message may be created that includes the hash values from the prior blocks of two different hash chains, as shown below.

```
{ "Name":"John Maximus",
  "History Chain Prior Hash Value":
    "493C9197B82C6474817246F8632FED423C4861F1",
  "Field Chain Prior Hash Value":
    "8B98FE2B8ACA934B2998BEBD2885905445A28928" }
```

From the message above the single hash value below is generated.
SHA-1 hash value: 4F0979C3CDBA78D502A29583B05C6D31EB831B74

The single hash value above may be used in a single block that is part of two different hash chains, the "History Chain" and the "Field Chain". The single hash value may be used in the chain data information for both hash chains that will receive the new block.

Alternatively, two different messages may be generated with one message for each hash chain, as shown below.

```
{ "Name":"John Maximus",
  "History Chain Prior Hash Value":
    "493C9197B82C6474817246F8632FED423C4861F1" }
{ "Name":"John Maximus",
  "Field Chain Prior Hash Value":
    "8B98FE2B8ACA934B2998BEBD2885905445A28928" }
```

Processing the messages above with the SHA-1 algorithm yields the hash values below.
SHA-1 History Chain hash value: 29F2198B523EF0DBA298407C2133F825065EC122
SHA-1 Field Chain hash value: 536A20F1EE09AFB3198F8C10C4E5B5590FEC3813

The two hash values above may be used in two different new blocks for the two different chains.

In Step 328, blocks are generated. In one or more embodiments, the blocks are generated by collecting all of the information for the field data sets and chain data sets into the blocks. For example, a write request that updates two fields may include two field data sets, one for each updated field, and one or more chain data sets. The chain data sets include the hash chain identifiers, hash values, and prior block identifiers that are needed to integrate the blocks into the hash chains. One or more of the field data sets in a block may include field block identifiers instead of field values, which may reduce the size of the block when the field values are large objects.

In one or more embodiments, when a block is generated that is a summary block, information for field data sets for all of the fields of the object may be included in the summary block. A summary block, or any other block, may include a mixture of field values and field block identifiers for the field data sets.

In Step 330, blocks are stored in the hash chains. In one or more embodiments, the blocks are stored in the hash chains by updating the end block identifiers to identify the newly generated blocks and append the newly generated blocks to their respective hash chains.

In Step 332, block identifiers are updated. In one or more embodiments that include object field block identifiers in the object, the object field block identifiers are updated to identify the correct blocks in the hash chains. For example, an object may include a set of object field block identifiers that identify the blocks in the hash chains that have the current field values for the fields of the object. Using the object field block identifiers reduces the amount of time needed to determine the current state of the object and the current values of the fields, as compared to determining the current state of the object and values of the fields by looking the field values by traversing multiple blocks of the hash chains.

Figure 4:
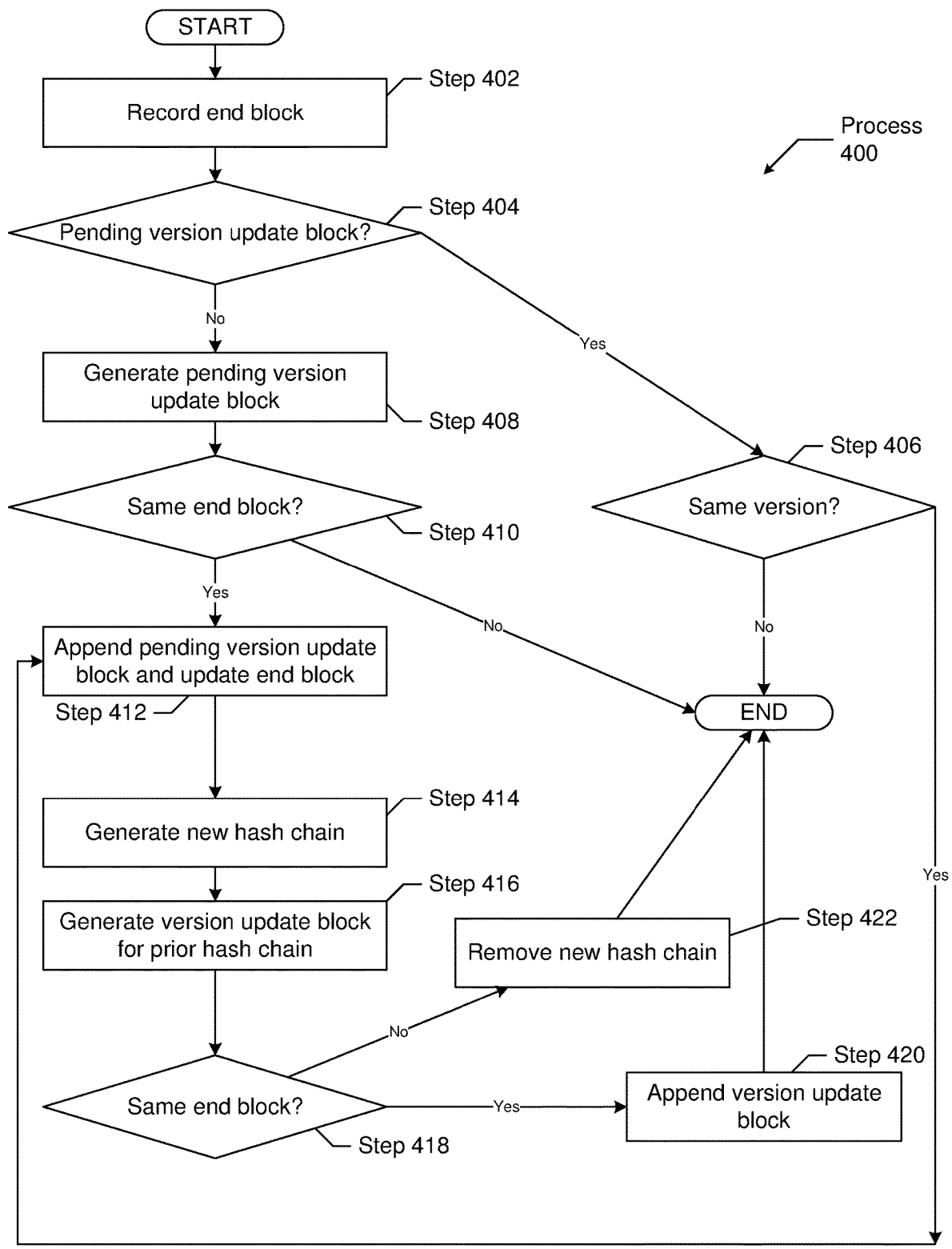
Figure 9:
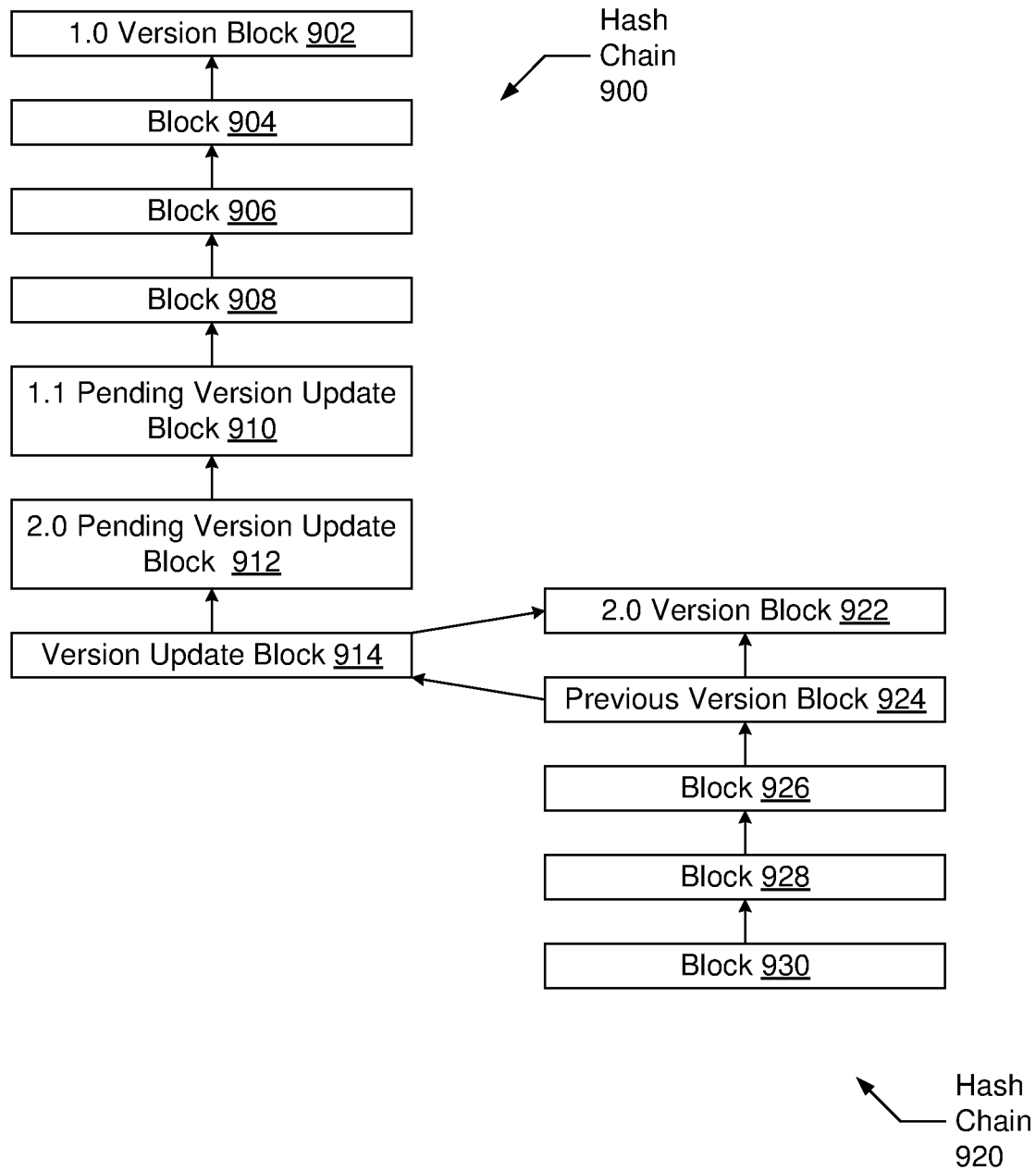

FIG. 4 shows a flowchart in accordance with one or more embodiments of the disclosure. The flowchart of FIG. 4 depicts a process (400) of an updater function that updates a hash chain to a new version using a new hash chain, an example of which is shown in FIG. 9. The process (400) may be implemented on one or more components of the system (100) of FIG. 1. In one or more embodiments, one or more of the steps shown in FIG. 4 may be omitted, repeated, combined, and/or performed in a different order than the order shown in FIG. 4. Accordingly, the scope of the present disclosure should not be considered limited to the specific arrangement of steps shown in FIG. 4.

In one or more embodiments, the process (400) is executed by an updater function to update one or more chains of the object to store blocks of multiple different versions. In one or more embodiments, the object allows multiple concurrent access and the updater function is one of multiple updater functions that attempt to update the version of the object. In one or more embodiments, pending version update blocks and version update blocks are appended to the old hash chains and new hash chains for the updated versions are created, which is further discussed below.

In Step 402, an end block is recorded. In one or more embodiments, the updater function records an end block identifier for the hash chain that is being updated.

In Step 404, whether the end block is a pending version update block is determined. Pending version update blocks include in a field data set or chain data set a version that the hash chain will be updated to. The only blocks that can be appended to a pending version update block are subsequent pending version update blocks of a higher version number and version update blocks, which provide links between the old hash chain and the new hash chain. When the end block is a pending version update block, the process (400) continues to Step 406. When the end block is not a pending version update block, the process (400) continues to Step 408.

In Step 406, whether the pending version update block is the same version as the updater function is determined. With multiple concurrent access to the object, other updater functions may attempt to update the version of the object. In one or more embodiments, if the versions of the pending version update block and the current updater function match, then a different updater function has already appended a pending version update block as the end block to the hash chain and the current updater function does not need to append a pending version update block. In one or more embodiments, if the versions of the pending version update block and the current updater function do not match, then a different updater function has already appended a pending version update block with a newer version than the current updater function and the current updater function terminates. When the pending version update block is the same version as the updater function, the process (400) continues to Step 414. When the pending version update block is not the same version as the updater function, the process (400) ends.

In Step 408, a pending version block is generated. In one or more embodiments, the updater function generates the pending version update block. The pending version update block identifies the target version of the object. The target version of the object is associated with the updater function and is the version to which the hash chain of the object will be updated by the updater function.

In Step 410, whether the current end block of the hash chain is the same as the previously recorded end block is determined. In one or more embodiments, if the current and previously recorded end blocks are the same and match, then no other updater functions with higher version numbers have intervened and the current updater function proceeds. In one or more embodiments, if the current and previously recorded end blocks are not the same and there is a mismatch, then another updater function has intervened and updated the hash chain and the current updater function terminates. When end blocks match, the process (400) continues to Step 412. When there is a mismatch, the process (400) ends.

In Step 412, the pending version update block is appended and the end block is updated. In one or more embodiments, the updater function appends the pending version update block to the hash chain and updates the recorded end block to identify the newly appended pending version update block. Appending the pending version update block to the hash chain serves to notify other updater functions of the version to which the current updater function will update the hash chain. Updating the recorded end block facilitates subsequent checks for whether another updater function has updated the hash chain.

In Step 414, a new hash chain is generated. In one or more embodiments, the updater function creates a new hash chain with a new version block that identifies the target version of the updater function.

In Step 416, a version update block for the prior hash chain is generated. In one or more embodiments, the updater function generates the version update block, which is linked to the version block of the new hash chain. In one or more embodiments, the updater function also generates a previous version block that is appended to the new version block of the new chain and includes a link to the version update block. The previous version block allows accessor functions that traverse the new hash chain to also traverse the prior hash chain so that the blocks with field data in both the prior hash chain and the new hash chain are available to the accessor functions. The previous version block includes a link to the version block in the new hash chain and a link to a version update block in the prior hash chain. Accessor functions that reach the prior version block and are searching for a block follow the link to the version update block and the prior hash chain. Accessor functions that reach the prior version block and are searching for version data in a version block follow the link to the version block of the new hash chain to access the version data in the version block of the new hash chain.

In Step 418, whether the current end block of the hash chain is the same as the recorded end block is determined. In one or more embodiments, if the current and recorded end blocks are the same and match, then no other updater functions with higher version numbers have intervened to create the new hash chain and the current updater function proceeds. In one or more embodiments, if the current and recorded end blocks are not the same and there is a mismatch, then another updater function has intervened to create the new hash chain. When end blocks match, the process (400) continues to Step 420. When there is a mismatch, the process (400) continues to Step 422.

In Step 420, the version update block is appended. In one or more embodiments, the version update block is appended to the prior version hash chain by the updater function. The version update block is the last block of the prior version hash chain and subsequent blocks with data field updates will be appended to the new hash chain. After Step 420, the process (400) ends.

In Step 422, the new hash chain is removed. In one or more embodiments, a different updater function already created a hash chain for the new version and the current updater function disposes of the new hash chain and version update block that were generated at Steps 414 and 416. After Step 422, the process (400) ends.

FIGS. 5A, 5B, 5C, 6, 7, 8 and 9 show examples of hash chains that may be included by objects. An object may include one or more of the hash chains from the hash chains shown in FIGS. 5A, 5B, 5C, 6, 7, 8 and 9.

Figure 5A:
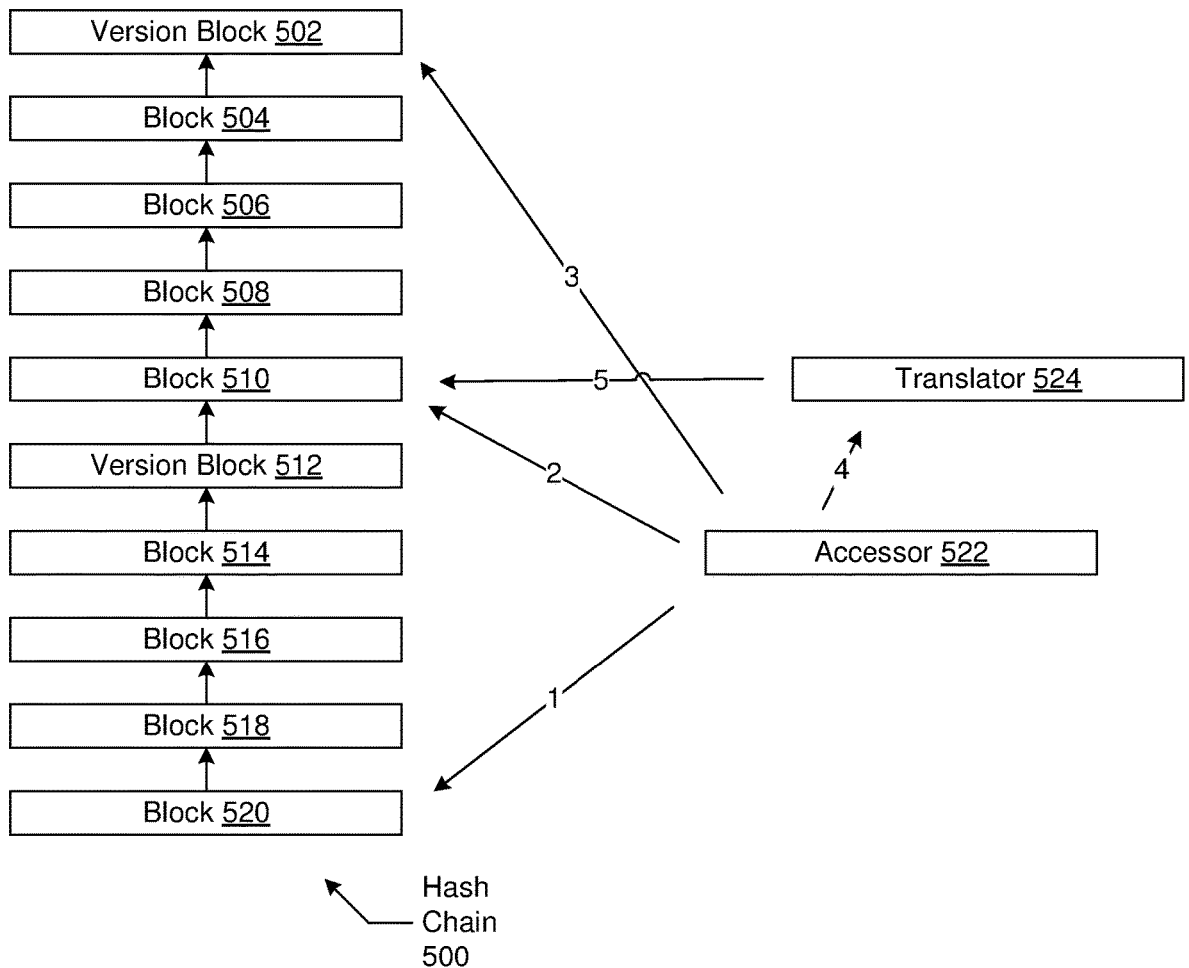
FIG. 5A, FIG. 5B, FIG. 5C, FIG. 6, FIG. 7, FIG. 8, and FIG. 9 show examples in accordance with one or more embodiments of the present disclosure.
Figure 5B:
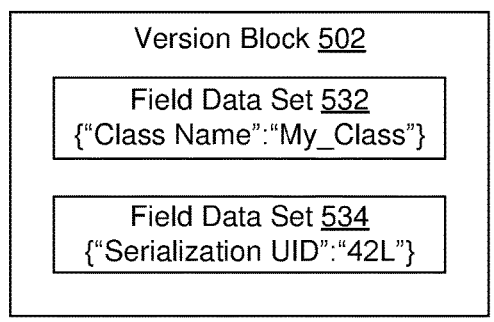
Figure 5C:
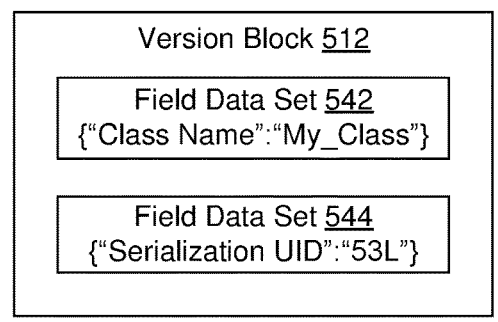

Referring to FIGS. 5A, 5B, and 5C, the hash chain (500) includes the blocks (502-520). In one or more embodiments, one or more of the blocks and data members shown in FIGS. 5A, 5B, and 5C may be omitted, repeated, combined, and/or rearranged. Accordingly, the scope of the present disclosure should not be considered limited to the specific arrangement of blocks and data members shown in FIGS. 5A, 5B, and 5C.

The hash chain (500) is a hash chain of an object that stores the values of one or more fields of the object in the blocks (504-510, 514-520). The version blocks (502, 512) identify the version of the object when the block was appended to the hash chain (500).

The accessor (522) is an accessor function that accesses the blocks of the hash chain (500). The translator (524) is a translator function that accesses blocks of previous versions and translates the data from the previous version blocks to the current version of the object.

The accessor (522) includes one or more criteria that are satisfied by the block (510). To locate the block (510), the accessor (522) begins with the end block (520) of the hash chain (500) and traverses the hash chain (500) until the criteria is satisfied with the block (510). After locating the block (510), the accessor (522) continues to traverse the hash chain (500) to locate the version block (502), which contains the version data for the block (510).

After locating the version block (502), the accessor (522) determines that the version of the block (510) is not compatible and is a mismatch to the version of the accessor (522). After identifying the mismatch, the accessor (522) calls the translator (524) to access and return the data from the block (510) for the accessor (522).

Referring to FIG. 5B, the version block (502) includes the field data sets (532, 534). The field data set (532) identifies the class of the object using a JSON formatted string with the name of the class being "My_Class". The field data set (534) identifies the serialization universal identifier (UID) for a version of the object using a JSON formatted string as "42L", which is the value 42 stored as long data type.

Referring to FIG. 5C, the version block (512) is for a different version of the object and includes the field data sets (542, 544). The field data set (542) identifies the class of the object as being "My_Class", which is the same as for the version block (502) of FIG. 5B. The field data set (534) identifies the serialization UID for a different version of the object as "53L".

Figure 6:
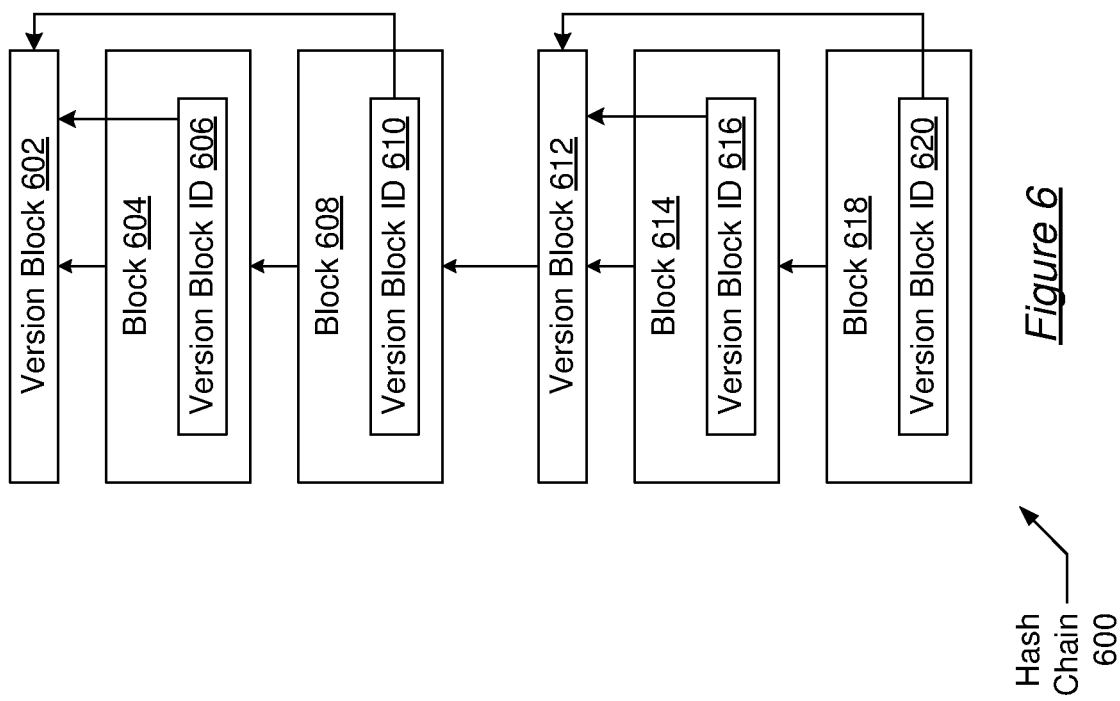

Referring to FIG. 6, the hash chain (600) includes the blocks (602, 604, 608, 612, 614, 618). In one or more embodiments, one or more of the blocks and data members shown in FIG. 6 may be omitted, repeated, combined, and/or rearranged. Accordingly, the scope of the present disclosure should not be considered limited to the specific arrangement of blocks and data members shown in FIG. 6.

The hash chain (600) includes the version blocks (602, 612) for storing version data and includes the blocks (604, 608, 614, 618) for storing field data. In addition to storing field data, the blocks (604, 608, 614, 618) respectively include the version block identifiers (606, 610, 616, 620). The version block identifiers (606, 610) of the blocks (604, 608) refer back to and identify the version block (602) as containing the version data that is associated with the blocks (604, 608). The version block identifiers (616, 620) of the blocks (614, 618) refer back to and identify the version block (612) as containing the version data that is associated with the blocks (614, 618).

The accessor functions that access the hash chain (600) directly locate the version data for a block without further traversal of the hash chain (600). For example, an accessor function that accesses the block (608) identifies the version block (602) from the version block identifier (610) within the block (608). The version data for the block (608) is then accessed from the version block (602) without having to traverse the hash chain (600) through the block (604) to reach the version block (602).

Figure 7:
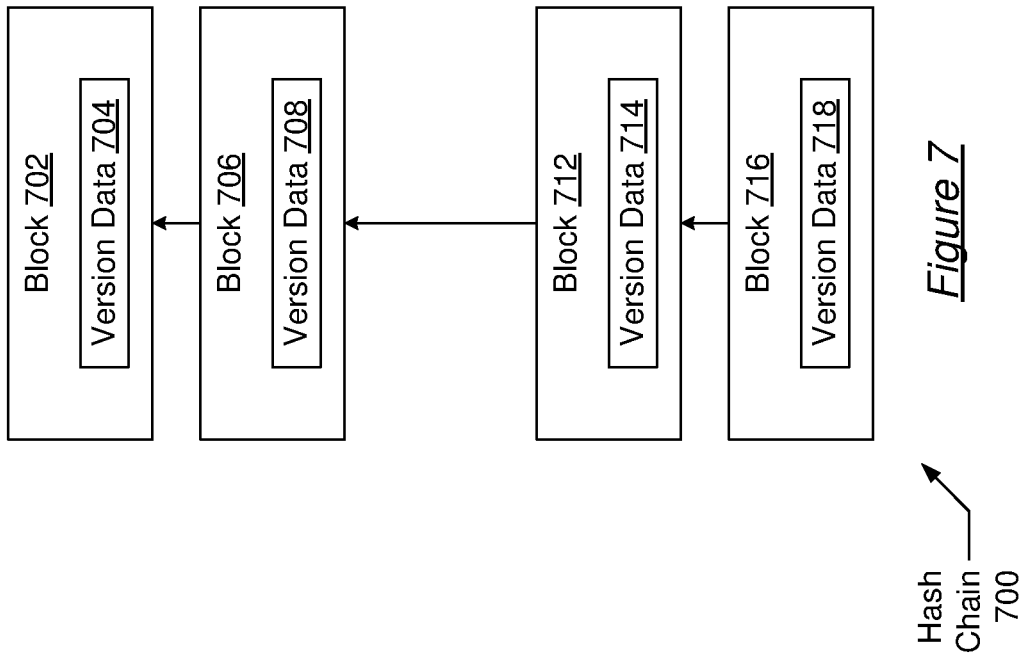

Referring to FIG. 7, the hash chain (700) includes the blocks (702, 706, 712, 716). In one or more embodiments, one or more of the blocks and data members shown in FIG. 7 may be omitted, repeated, combined, and/or rearranged. Accordingly, the scope of the present disclosure should not be considered limited to the specific arrangement of blocks and data members shown in FIG. 7.

The hash chain (700) stores the field data along with the version data (704, 708, 714, 718) in the blocks (702, 706, 712, 716). The accessor functions that access the hash chain (700) directly retrieve the version data for a block from the block itself without further traversal of the hash chain (700) or referencing another block in the chain. For example, an accessor function that accesses the block (706) retrieves the version data (708) from the block (706).

Figure 8:
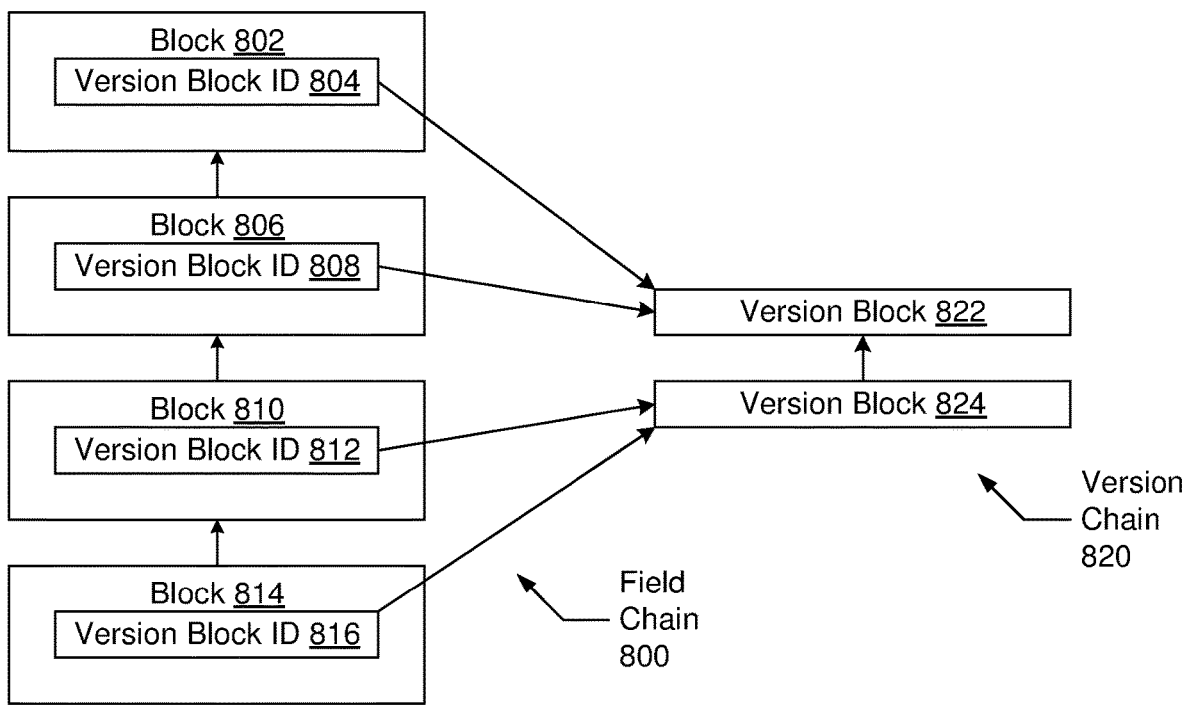

Referring to FIG. 8, the hash chain (800) includes the blocks (802, 806, 810, 814) and the hash chain (820) includes the blocks (822, 824). In one or more embodiments, one or more of the blocks and data members shown in FIG. 8 may be omitted, repeated, combined, and/or rearranged. Accordingly, the scope of the present disclosure should not be considered limited to the specific arrangement of blocks and data members shown in FIG. 8.

The hash chain (800) is a field chain for storing the field data of an object in the blocks (802, 806, 810, 814). The hash chain (820) is a version chain for storing the version data associated with the blocks of the field chain (800) of the object.

In addition to storing field data, the blocks (802, 806, 810, 814) respectively include the version block identifiers (804, 808, 812, 816). The version block identifiers (804, 808) of the blocks (802, 806) refer to and identify the version block (822) of the version chain (820) as containing the version data that is associated with the blocks (802, 806). The version block identifiers (812, 816) of the blocks (810, 814) refer to and identify the version block (824) of the version chain (820) as containing the version data that is associated with the blocks (810, 814).

The accessor functions that access the hash chain (800) directly locate the version data for a block without further traversal of the field chain (800) and without reversal of the version chain (820). For example, an accessor function that accesses the block (806) of the field chain (800) identifies the version block (822) of the version chain (820) from the version block identifier (808) within the block (806). The version data for the block (806) in the field chain (800) is then accessed from the version block (822) in the version chain (820) without having to traverse either the field chain (800) or the version chain (820) to retrieve the version data from the version block (822).

Referring to FIG. 9, the hash chain (900) includes the blocks (902-914) and the hash chain (920) includes the blocks (922-930). In one or more embodiments, one or more of the blocks and data members shown in FIG. 9 may be omitted, repeated, combined, and/or rearranged. Accordingly, the scope of the present disclosure should not be considered limited to the specific arrangement of blocks and data members shown in FIG. 9.

The object associated with the hash chain (900) and the hash chain (920) stored the blocks (904-908) according to the 1.0 version block (902). A 1.1 updater function attempted to update the object to a 1.1 version and appended the 1.1 pending version update block (910). Before being completed, a 2.0 updater function successfully updated the object to a 2.0 version. The 2.0 updater function appended the 2.0 pending version update block (912) and generated the hash chain (920). The hash chain (920) was created with the 2.0 updater function by generating the 2.0 version block (922), appending the version update block (914) to the 2.0 pending version update block (912) in the hash chain (900), and appending the previous version block (924) to the 2.0 version block (922) in the hash chain (920).

To locate a block in the hash chain (900), an accessor function starts at the end block (930) of the chain (920). The accessor function traverses the hash chain (920) to the previous version block (924), identifies the end block of the hash chain (900) as the version update block (914) from the previous version block (924), and traverses the hash chain (900) starting from the version update block (914) to locate one of the blocks (904-908) in the hash chain (900).

To identify the version data of the blocks (926-930), an accessor function traverses the hash chain (920) to the previous version of block (924) and continues to traverse the hash chain (920) to the 2.0 version block (922) without traversing the hash chain (900). To identify the version of the blocks (904-908), an accessor function traverses the hash chain (900) to the 1.0 version block (902).

Embodiments may be implemented on a computing system. Any combination of mobile, desktop, server, router, switch, embedded device, or other types of hardware may be used. For example, as shown in FIG. 10A, the computing system (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), and numerous other elements and functionalities.

The computer processor(s) (1002) may be an integrated circuit for processing instructions. For example, the computer processor(s) may be one or more cores or micro-cores of a processor. The computing system (1000) may also include one or more input devices (1010), such as a touchscreen, keyboard, mouse, microphone, touchpad, electronic pen, or any other type of input device.

The communication interface (1012) may include an integrated circuit for connecting the computing system (1000) to a network (not shown) (e.g., a local area network (LAN), a wide area network (WAN) such as the Internet, mobile network, or any other type of network) and/or to another device, such as another computing device.

Further, the computing system (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (1000) in FIG. 10A may be connected to or be a part of a network. For example, as shown in FIG. 10B, the network (1020) may include multiple nodes (e.g., node X (1022), node Y (1024)). Nodes may correspond to a computing system, such as the computing system shown in FIG. 10A, or a group of nodes combined may correspond to the computing system shown in FIG. 10A. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (1000) may be located at a remote location and connected to the other elements over a network.

Although not shown in FIG. 10B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1022), node Y (1024)) in the network (1020) may be configured to provide services for a client device (1026). For example, the nodes may be part of a cloud computing system. The nodes may include functionality to receive requests from the client device (1026) and transmit responses to the client device (1026). The client device (1026) may be a computing system, such as the computing system shown in FIG. 10A. Further, the client device (1026) may include and/or perform at least a portion of one or more embodiments of the disclosure.

The computing system or group of computing systems described in FIGS. 10A and 10B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 10A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 10A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 10A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 10A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 10A and the nodes and/or client device in FIG. 10B. Other functions may be performed using one or more embodiments of the disclosure.

While the disclosure has been described with respect to a limited number of embodiments, those skilled in the art, having benefit of this disclosure, will appreciate that other embodiments may be devised which do not depart from the scope of the disclosure. Accordingly, the scope of the disclosure should be limited only by the attached claims.

What is claimed is:

1. A method comprising:
    locating, with an accessor function, a block of a hash chain, wherein the block includes a field value of a field of an object, wherein the object is a programming object comprising an object version;
    locating version data using the block, wherein the version data identifies a block version of the block that identifies the object version;
    comparing the block version to a function version of the accessor function;
    returning the field value from the block when the block version matches the function version; and
    calling a version matched accessor function to return the field value when the block version does not match the function version.

2. The method of claim 1, further comprising:
    traversing the hash chain from the block to locate a version block that includes the version data.

3. The method of claim 2,
    wherein the block includes a version block identifier that identifies the version block.

4. The method of claim 1,
    wherein the version data is stored in the block.

5. The method of claim 1,
    wherein the version data is stored in a version block in a version hash chain of the object.

6. The method of claim 1,
    wherein the version data is in a version block in the hash chain; and
    wherein the version block is referenced by a previous version block that references a previous version hash chain.

7. The method of claim 1, further comprising:
    identifying the version matched accessor function from the block version.

8. A system comprising:
    a memory coupled to a computer processor;
    the memory comprising:
        an object with a plurality of fields that includes a field;
    the object executes on the computer processor, uses the memory, and is configured for:
        locating, with an accessor function, a block of a hash chain, wherein the block includes a field value of a field of the object, wherein the object is a programming object comprising an object version;
        locating version data using the block, wherein the version data identifies a block version of the block that identifies the object version;
        comparing the block version to a function version of the accessor function;
        returning the field value from the block when the block version matches the function version; and
        calling a version matched accessor function to return the field value when the block version does not match the function version.

9. The system of claim 8, wherein the object is further configured for:
    traversing the hash chain from the block to locate a version block that includes the version data.

10. The system of claim 9,
    wherein the block includes a version block identifier that identifies the version block.

11. The system of claim 8,
    wherein the version data is stored in the block.

12. The system of claim 8,
    wherein the version data is stored in a version block in a version hash chain of the object.

13. The system of claim 8,
    wherein the version data is in a version block in the hash chain; and wherein the version block is referenced by a previous version block that references a previous version hash chain.

14. The system of claim 8, wherein the object is further configured for:
    identifying the version matched accessor function from the block version.

15. A non-transitory computer readable medium comprising computer readable program code for:
    locating, with an accessor function, a block of a hash chain, wherein the block includes a field value of a field of an object, wherein the object is a programming object comprising an object version;
    locating version data using the block, wherein the version data identifies a block version of the block that identifies the object version;
    comparing the block version to a function version of the accessor function;
    returning the field value from the block when the block version matches the function version; and
    calling a version matched accessor function to return the field value when the block version does not match the function version.

16. The non-transitory computer readable medium of claim 15, further comprising computer readable program code for:
    traversing the hash chain from the block to locate a version block that includes the version data.

17. The non-transitory computer readable medium of claim 16,
    wherein the block includes a version block identifier that identifies the version block.

18. The non-transitory computer readable medium of claim 15,
    wherein the version data is stored in the block.

19. The non-transitory computer readable medium of claim 15,
    wherein the version data is stored in a version block in a version hash chain of the object.

20. The non-transitory computer readable medium of claim 15,
    wherein the version data is in a version block in the hash chain; and
    wherein the version block is referenced by a previous version block that references a previous version hash chain.

\* \* \* \* \*